Oct. 25, 1932.  M. FELLERMAN  1,885,092
PORTABLE BEVERAGE SERVICE AND DISPENSER
Filed Aug. 28, 1930  3 Sheets-Sheet 1
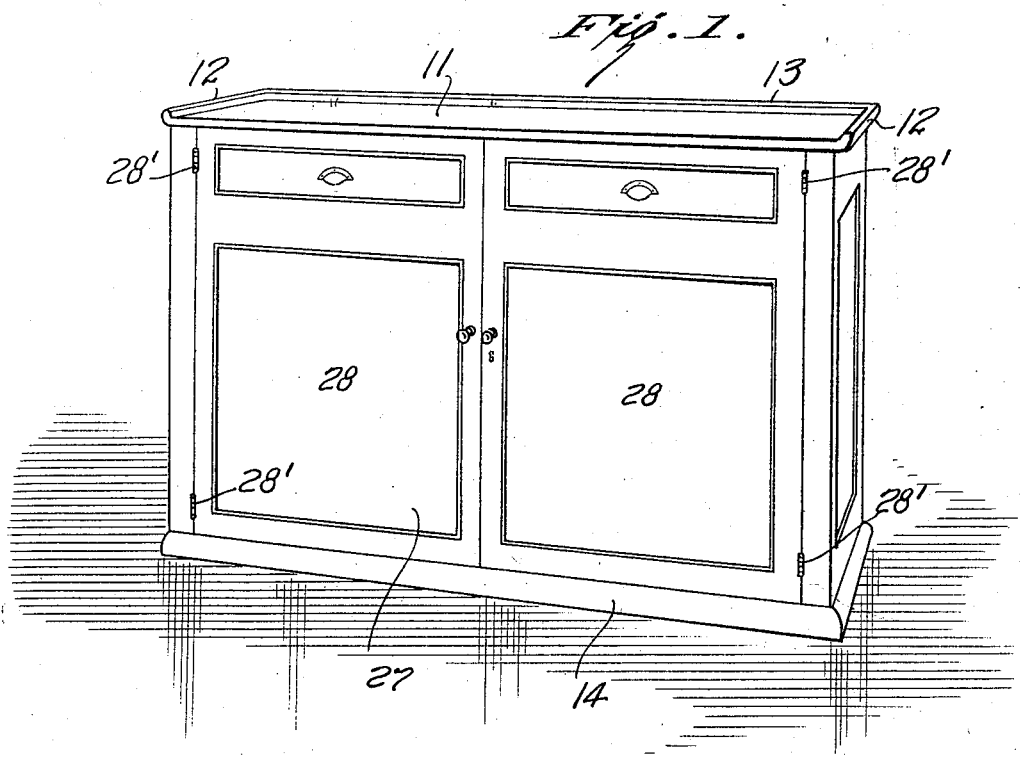
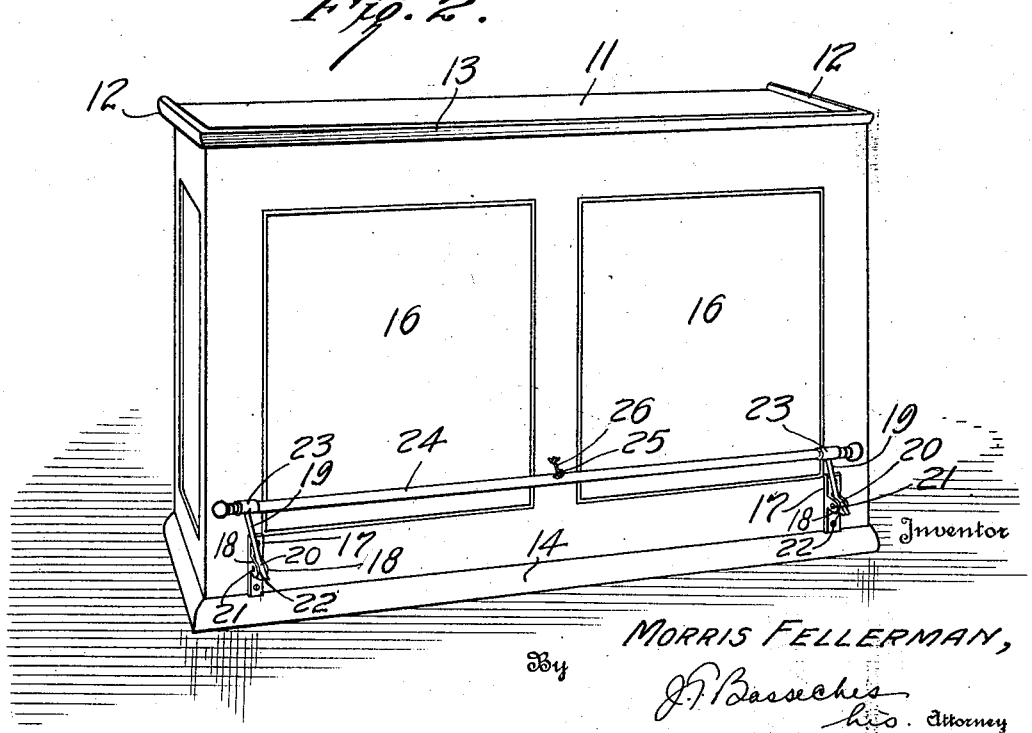
Morris Fellerman, Oct. 25, 1932.  M. FELLERMAN  1,885,092
PORTABLE BEVERAGE SERVICE AND DISPENSER
Filed Aug. 28, 1930  3 Sheets-Sheet 2
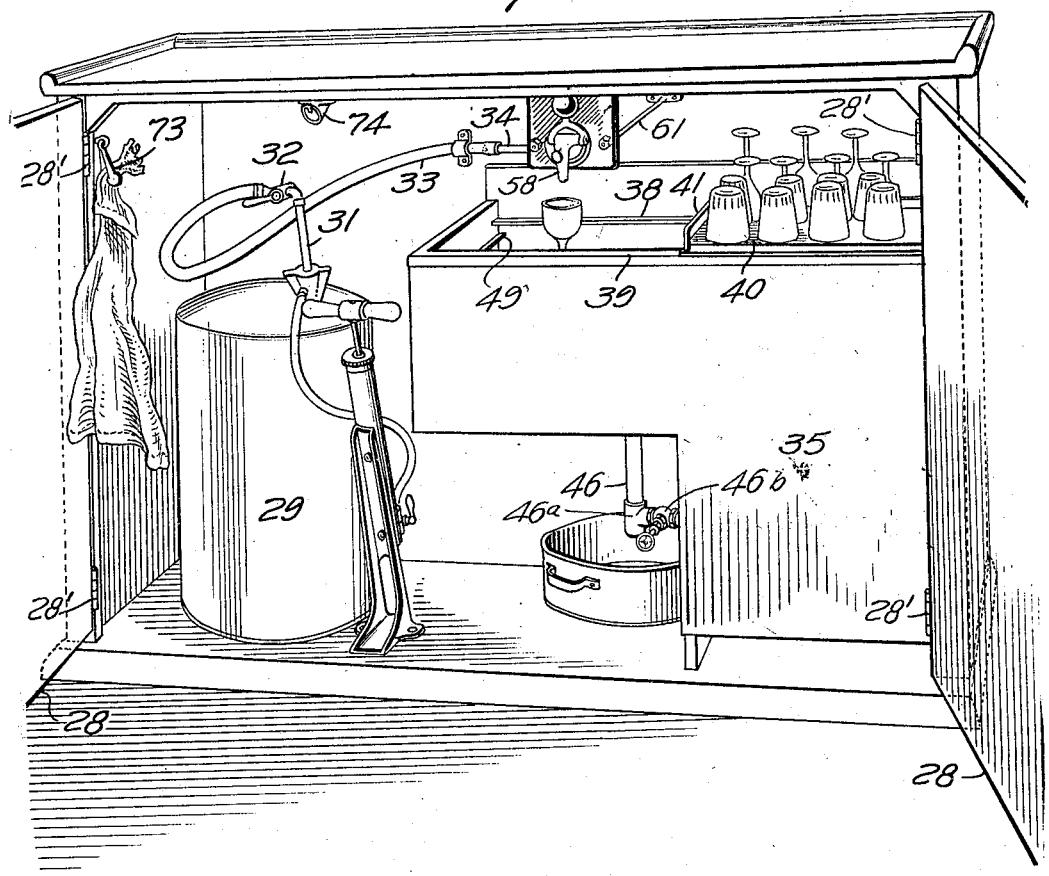
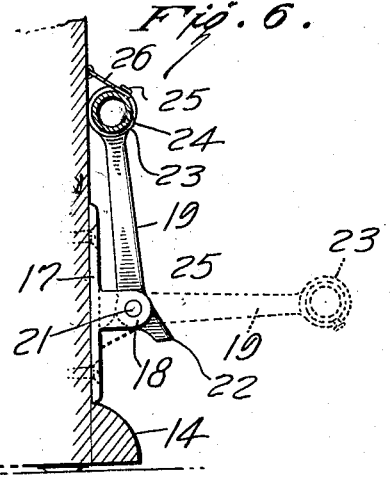
Inventor
MORRIS FELLERMAN,
By J.T. Basseches
his Attorney Oct. 25, 1932.  M. FELLERMAN  1,885,092

PORTABLE BEVERAGE SERVICE AND DISPENSER

Filed Aug. 28, 1930  3 Sheets-Sheet 3

Inventor
MORRIS FELLERMAN,
J. P. Basseches
his Attorney

Patented Oct. 25, 1932

1,885,092

UNITED STATES PATENT OFFICE

MORRIS FELLERMAN, OF JERSEY CITY, NEW JERSEY

PORTABLE BEVERAGE SERVICE AND DISPENSER

Application filed August 28, 1930. Serial No. 478,341.

This invention relates to dispensing devices, more particularly to portable dispensing devices and counters for service of beverages.

It is contemplated by my invention, as an object thereof, to provide a counter or bar assembly for the service of beverages useful by hostelries, clubs and homes which includes the requisites for dispensing and preparing cooled or iced beverages, cooling and washing or cleaning facilities, without the plumbing attachments and installation customarily employed in fixtures of this character. It is contemplated by my invention to provide facilities for improvised places of entertainment, gatherings, with the accessories necessary for service of refreshments in the nature of beverages and the like, in a unit permitting ready portability by reason of its completeness, necessitating no further plumbing installation for complete operation and use.

It is a further object of my invention to provide an accessory in the nature of household furniture which may be used for the service of beverages, which is easily portable and movable to whatever location is desired and complete in every respect for such purposes as service of beverages may require, including cooling, dispensing, cleaning, washing, and storage of the accessories necessary for such service.

Other objects of my invention contemplate the provision of a beverage dispensing device of novelty in portability and details of construction which will appear more clearly and be apparent at hereinafter pointed out.

To attain these objects and such further objects as may appear herein or be hereinafter pointed out, I make reference to the accompanying drawings forming a part hereof, in which Figure 1 is a perspective view of the front of my device when not in use.

Figure 2 is a perspective view of the rear of the same.

Figure 3 is a perspective view of the same with the closure elements partially open.

Figure 6 is a fragmentary sectional view of the foot rail construction.

Figure 7 is a perspective view of the spigot bracket mounting.

Figure 4:
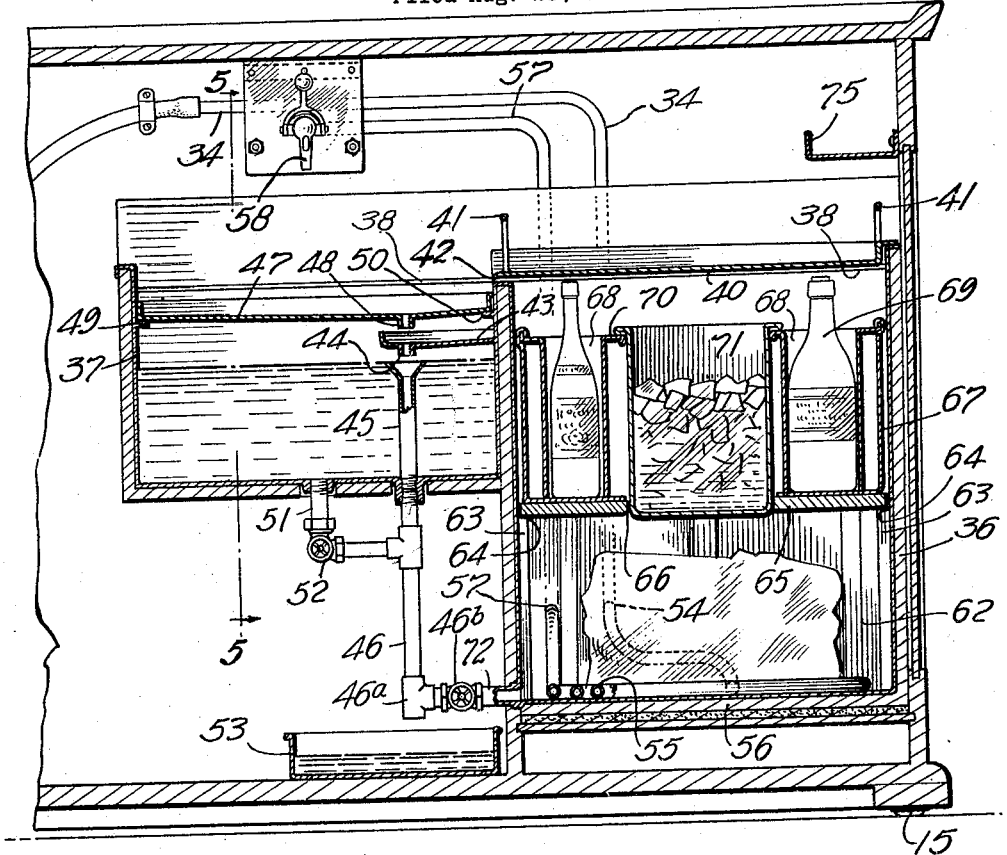
Figure 4 is a fragmentary longitudinal sectional view taken on the line 4—4 of Figure 3.
Figure 5:
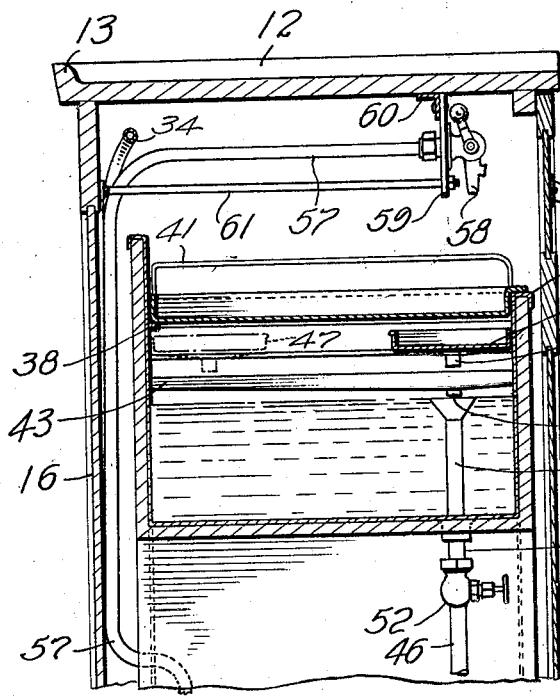
Figure 5 is a section taken on the line 5—5 of Figure 4.

Making reference to the drawings, my device comprises generally a cabinet 10, including a top 11, formed with side rails 12 and front rail 13 cooperating with said top to form a counter. A base 14 has disposed therefrom supporting members 15 in the nature of casters or glides to mount the entire cabinet for ready portability and sliding movement upon the floor surface.

The cabinet includes a rear wall 16 suitably paneled and ornamented for a modern piece of furniture. Adjacent the base thereof there is included a pair of brackets 17, suitably fastened to the wall 16 as by screws. These brackets include a pair of ears 18 between which are disposed bracket arms 19 the inner ends of which include a boss 20 orificed to receive a pin 21 driven through the ears 18 to provide pivotal mounting for the arms. An offset portion 22 formed on the boss 20, serves to limit the pivotal movement of the arms to the horizontal position as will be readily understood.

The free ends of the arms 19 are formed with rings 23 through which there is mounted the foot rail 24 preferably permitting free rotation thereof in the rings 23. Intermediate the length of the rail it is provided with an eye 25 for connection with a hook 26 fastened to the cabinet serving to hold the rail in the vertical position when not in use. The free rotary movement of the rail will permit the eye 25 to be disposed in a position forming no obstruction.

The cabinet is provided at its front face 27 with a pair of closures or doors 28 mounted upon hinges 28' which are preferably of a construction to permit ready removal of the doors bodily by including a slidable pintal.

Disposed interiorly of the cabinet upon opening of the doors I provide beverage dispensing accessories of novel construction and combination as will now be described.

Primarily I include a beverage tank or receptacle 29, connected with pressure feeding means such as the pump or other pressure means such as a carbonic acid pressure tank whereby beverage may be fed through the line 31 controlled by the valve 32 and connected by the hose 33 to a block tin pipe line 34.

Also enclosed within the cabinet is a combined cooling and glassware cleansing assembly generally referred to at 35 comprising a refrigerating or cooling chamber 36 and a tank 37, having preferably coterminus openings upwardly directed. The chamber 36 and tank 37 are both suitable lined with sheet metal or wholly made of metal as will be readily understood.

Disposed along the full width of the chamber 36 and tank 37 there is provided a rail 38 over which and the edge 39 there is provided a closure 40 serving to alternately close either the chamber 36 and the tank 37. This closure serves also in the nature of a drain for glassware and such as tumblers which may while still wet be inverted and placed thereon and when so formed is inclined towards the tank 37. This closure may also include a guard rail 41 to prevent accidental displacement of articles mounted thereon.

Immediately below the edge 42 of the drain there is disposed a tray 43 lying cross wise of the tank 37 having a drain opening 44 opening into the over flow pipe 45 running through the tank to the waste pipe 46.

Lying lengthwise of the tank 37 is a tray 47 having a drain opening 48 disposed immediately above the tray 43 previously described. The tray 47 is disposed upon rails 49 and 50 respectively running crosswise of the tank 37 so that in every position of the tray 47 it will empty into the tray 43. The slidable movement of the tray permits ready access to the tank 37 should it be desired to reach the same as when this is filled with wash water for cleansing or washing of the glassware. A waste outlet 51 is provided at the bottom of the tank and this is connected with the pipe 46 and is controlled by the shut off valve 52 shown so that the contents of the tank may be collected in the waste tray 53.

The pipe line 34 is conducted into the lower portion of the chamber 36 at 54 where it is formed in a number of convolutions or coils 55 resting on the bottom 56 of the chamber. The return end of the pipe is shown at 57 and is mounted upon the interior face of the wall 16 and conducted to the spigot 58 which is in turn mounted upon the downwardly disposed plate 59 affixed to angle plate 60. Rods 61 connect to the end of the plate and the wall 16 respectively and hold the plate rigidly.

The general position of the spigot 58 is such as to make it conveniently accessible by the server and it will be observed that the drippings thereof will fall into the tray 47 when this is in the forward position.

The chamber 37 is divided into an ice compartment 62 including insulating walls 63 into which may be conveniently disposed the necessary quantity of ice or refrigerating mixture to overly the coils 55. The walls 63 terminate short of the length of the chamber at 64 which form abutting shoulders serving to support the frame 65, having a central opening 66.

The frame so provided serves to support a tray 67 having a plurality of compartments 68 into which may be fitted bottled beverages 69. A central flange 70 serves to support a tray 71 for holding an additional quantity of ice or other refrigerating material which may be used with beverages or to cool the bottled beverages disposed about the same. The entire tray 67 may be removed upon sliding of the tray 40 to fill the ice compartment 62. Similarly the tray 71 may be removed to make the ice compartment 62 available for additional ice or materials stored there.

The ice compartment 62 has provided a drain pipe 72 connecting with the waste pipe 46 by the T joint 46a and controlled by the valve 46b as it may be found necessary to drain the melted contents from the ice compartment.

Other accessories such as a towel holder 73, bottle opener 74 and tray 75 may also be provided to complete the assembly.

It will thus be observed that I have provided a beverage dispensing device which is complete and portable without requiring any plumbing installation, making the device convenient for hostelries, club rooms, lodge rooms and the like for transportation from one room to the other wherever service is required and permitting units to be assembled in numbers as required depending upon the size of the gatherings to be accommodated. The device when not in use, may be moved to and against the wall of a room without inconvenience and in any way encumbering the appearance of the room as the device takes on the appearance of a buffet, cupboard or similar piece of furniture. In this form of use the face or wall 27 is displayed and the face or wall 16 is disposed flush with the wall of the room.

When desired for use, the device is readily rolled to the reverse position exposing the wall 16 towards the center of the room and making the foot rail 24 available for use while the server operates behind the counter upon removal or opening of the doors 28 to the rear face of the counter.

Variation in ornamentation and arrangement of the parts are contemplated within the scope of the claims.

Having thus described my invention and illustrated its use, what I claim as new and desire to secure by Letters Patent, is

1. In a service device of the character described, a cabinet including a top forming therewith a counter or the like, a bottom for said cabinet, a self-contained inter-connected beverage dispensing, storage and cooling assembly resting on said bottom and affixed to said interior of said cabinet, the cabinet being free from outside plumbing installation and including roller mounting for the same whereby the same may become readily portable.

2. In a beverage service of the character described comprising a cabinet mounted on rollers to be readily portable, the combination therewith of a self-contained inter-connected beverage dispensing, storage and cooling assembly comprising open ended compartments, one of which includes a cooling system, the other being adapted to hold cleansing fluid and a closure slidable to cover either of said compartments.

3. In a beverage service of the character described, mounted on rollers to be readily portable, the combination of a self-contained inter-connected beverage dispensing, storage and cooling assembly comprising open ended compartments, one of which includes a cooling system, the other of which being adapted to hold cleansing fluid, a slidable closure therefor common to said compartments in alternate positions thereof and serving as a drain tray, said last named compartment including a drain, a tray having an outlet connected with said drain and underlying said slidable closure in liquid receiving position, a second tray, superimposed over said first mentioned tray, having an outlet to said first tray and slidable in respect thereto, the exit end of said second tray being discharged into said first tray in all positions thereof.

In witness whereof I have hereunto signed my name this 7th day of August, 1930.

MORRIS FELLERMAN.